United States Patent
Hwang et al.

(10) Patent No.: US 10,965,679 B2
(45) Date of Patent: Mar. 30, 2021

(54) APPARATUS FOR MONITORING FILE ACCESS IN VIRTUAL MACHINE AND METHOD FOR THE SAME

(71) Applicant: ELECTRONICS AND TELECOMMUNICATIONS RESEARCH INSTITUTE, Daejeon (KR)

(72) Inventors: Woomin Hwang, Daejeon (KR); Hyunyi Yi, Incheon (KR); Sung-Jin Kim, Daejeon (KR); Seong-Joong Kim, Daejeon (KR); Chulwoo Lee, Daejeon (KR); Byung-Joon Kim, Daejeon (KR); Hyoung-Chun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 266 days.

(21) Appl. No.: 15/938,003

(22) Filed: Mar. 28, 2018

(65) Prior Publication Data
US 2019/0044946 A1    Feb. 7, 2019

(30) Foreign Application Priority Data
Aug. 7, 2017  (KR) .......................... 10-2017-0099703

(51) Int. Cl.
*H04L 29/06*    (2006.01)
*G06F 9/455*    (2018.01)
(Continued)

(52) U.S. Cl.
CPC ........ *H04L 63/101* (2013.01); *G06F 9/45558* (2013.01); *G06F 16/13* (2019.01);
(Continued)

(58) Field of Classification Search
CPC . H04L 63/101; G06F 16/1734; G06F 16/182; G06F 16/172; G06F 16/13;
(Continued)

(56) References Cited

U.S. PATENT DOCUMENTS 7,370,324 B2 * 5/2008 Goud .................. G06F 9/45558
                                                                714/15
9,092,625 B1 * 7/2015 Kashyap ............... G06F 21/566
(Continued)

FOREIGN PATENT DOCUMENTS

JP       2010-282242 A    12/2010
KR       10-1072807 B1    10/2011
(Continued)

OTHER PUBLICATIONS

Xuxian Jiang et al., "Stealthy Malware Detection Through VMM-Based "Out-of-the-Box" Semantic View Reconstruction," Conference: Proceedings of the 2007 ACM Conference on Computer and Communications Security, CCS 2007, Alexandria, Virginia, USA, Oct. 28-31, 2007.

(Continued)

*Primary Examiner* — Christopher A Revak
(74) *Attorney, Agent, or Firm* — LRK Patent Law Firm

(57) ABSTRACT

An apparatus for monitoring file access in a virtual machine in a cloud-computing system based on a virtualized environment includes a hypervisor for implementing at least one virtual machine and managing the virtual machine by monitoring a task in which a the virtual machine accesses a file loaded from storage to memory, the storage storing data including environment information of the virtual machine.

20 Claims, 6 Drawing Sheets

(51) Int. Cl.
 *G06F 16/13* (2019.01)
 *G06F 16/172* (2019.01)
 *G06F 16/182* (2019.01)
 *G06F 16/17* (2019.01)

(52) U.S. Cl.
 CPC ........ *G06F 16/172* (2019.01); *G06F 16/1734* (2019.01); *G06F 16/182* (2019.01); *G06F 2009/45587* (2013.01); *G06F 2009/45591* (2013.01)

(58) Field of Classification Search
 CPC ....... G06F 9/45558; G06F 2009/45591; G06F 2009/45587
 See application file for complete search history.

(56) References Cited

U.S. PATENT DOCUMENTS

| | | | |
|---|---|---|---|
| 9,465,636 | B2 | 10/2016 | Han et al. |
| 9,990,222 | B2 * | 6/2018 | Hardy ................. G06F 9/45558 |
| 10,142,353 | B2 * | 11/2018 | Yadav ..................... H04L 43/04 |
| 2010/0281273 | A1 * | 11/2010 | Lee ......................... F04B 33/00 713/190 |
| 2011/0289501 | A1 * | 11/2011 | Yamasaki ........... G06F 12/0875 718/1 |
| 2015/0020065 | A1 * | 1/2015 | Brant .................. H04L 67/2842 718/1 |
| 2015/0058519 | A1 * | 2/2015 | Armstrong .......... G06F 9/45533 711/6 |
| 2015/0199532 | A1 * | 7/2015 | Ismael .................. G06F 21/552 726/30 |
| 2016/0077851 | A1 * | 3/2016 | Ben-Yehuda ......... G06F 9/5016 718/1 |
| 2017/0103202 | A1 | 4/2017 | Kim et al. |
| 2019/0004956 | A1 * | 1/2019 | Takeuchi .............. G06F 3/0608 |
| 2019/0068555 | A1 * | 2/2019 | Tsirkin .................... H04L 63/20 |
| 2020/0241908 | A1 * | 7/2020 | Dornemann ......... G06F 11/1464 |

FOREIGN PATENT DOCUMENTS

| | | |
|---|---|---|
| KR | 10-2013-0022091 A | 3/2013 |
| KR | 10-1482903 B1 | 1/2015 |
| KR | 10-2016-0136489 A | 11/2016 |
| KR | 10-1673774 B1 | 11/2016 |
| KR | 10-2017-0041618 A | 4/2017 |

OTHER PUBLICATIONS

Chris Benninger et al., "Maitland: Lighter-Weight VM Introspection to Support Cyber-security in the Cloud," Cloud Computing (CLOUD), 2012 IEEE 5th International Conference, Honolulu, HI, USA, Jun. 24-29, 2012.

Wolfgang Richter et al., "Agentless Cloud-Wide Streaming of Guest File System Updates," Cloud Engineering (IC2E), 2014 IEEE International Conference, Boston, MA, USA, Mar. 11-14, 2014.

* cited by examiner

APPARATUS FOR MONITORING FILE ACCESS IN VIRTUAL MACHINE AND METHOD FOR THE SAME

CROSS REFERENCE TO RELATED APPLICATION

This application claims the benefit of Korean Patent Application No. 10-2017-0099703, filed Aug. 7, 2017, which is hereby incorporated by reference in its entirety into this application.

BACKGROUND OF THE INVENTION

1. Technical Field

The present invention relates to technology for monitoring access to a file system in respective virtual machines in real time for collectively stored multiple virtual machines that are running in a cloud-computing environment.

2. Description of the Related Art

Although virtual machines running on each single node of a cloud-computing system based on a virtualized environment are collectively stored and share resources therebetween, the virtual machines run so as to be recognized by users as independent computing systems. Accordingly, the respective virtual machines individually prepare for security threats.

As a method for monitoring a virtual machine, there are a method in which each virtual machine is monitored using an agent installed therein and a method in which virtual machines are monitored at the hypervisor level.

In the method of monitoring virtual machines using agents installed therein, accurate information on a virtual machine is collected by an agent and delivered to a hypervisor, whereby a sematic gap is overcome. This method is advantageous in that the virtual machine may be monitored using accurate information because semantic information that is present only in a virtual machine is directly delivered to the hypervisor. However, each agent redundantly consumes resources allocated to each Virtual Machine (VM), which may cause a scalability problem. Also, because the presence of a monitoring object in a virtual machine is exposed, when the security of the virtual machine is breached, an attempt to circumvent or incapacitate the monitoring object is frequently made. On the other hand, in the case of the method of monitoring at the hypervisor level, which corresponds to the method proposed by the present invention, because file access by a virtual machine is monitored at the hypervisor level, unnecessary resource consumption may be reduced, and it is difficult for the virtual machine to detect or incapacitate monitoring that is attempted on the system.

As research on a hypervisor-based monitoring method without the use of an agent, there are "Stealthy malware detection through VMM-based 'out-of-the-box' sematic view reconstruction", which was published in CCS in 2007, "Maitland: Lighter-weight VM introspection to support cyber-security in the cloud", which was published in IEEE CLOUD in 2012, and "Agentless Cloud-Wide Streaming of Guest File System Updates", which was published in IC2E, in 2014.

The first thesis, "Stealthy malware detection through VMM-based 'out-of-the-box' sematic view reconstruction", which was published in CCS in 2007, proposed a method for reducing a sematic gap between a host and a guest using a Virtual Machine Introspection (VMI) method and for inspecting low-level VM states. In the proposed method, sematic views inside a guest, such as files, processes, kernel modules, and the like, are reconstructed on a Virtual Machine Monitor (VMM) by casting guest OS data structures, whereby malware is detected using the reconstructed views. Here, in order to acquire more accurate sematic views, the method of reconstructing sematic information on a hypervisor is used, but this requires a guest kernel source and takes tens of seconds to tens of minutes. Accordingly, real-time malware detection may not be provided, and only limited types of malware operations may be detected.

The second thesis is "Maitland: Lighter-weight VM introspection to support cyber-security in the cloud", which was published in IEEE CLOUD in 2012. In this thesis, a lightweight introspection method applicable to a cloud environment is implemented in a para-virtualized environment using a dirty-memory-page-tracking method. In the proposed method, the states of dirty memory pages are monitored by tracking Memory Management Unit (MMU) updates and handling page faults, whereby an operation for unpacking or decrypting a malicious executable into machine code may be detected. This method somewhat curbs performance degradation compared to results of previous research, but includes a part that is operated in the kernel of the guest OS. Accordingly, this method can be applied only in a para-virtualized environment in which a guest OS is modified.

The third thesis, "Agentless Cloud-Wide Streaming of Guest File System Updates", which was published in the International Conference on Cloud Engineering in 2014, proposed a method for securing a file-level update stream in such a way that a snapshot of a virtual disk at a certain time is acquired, write requests are collected from among requests for block Input/Output (I/O), and metadata are extracted therefrom and are then combined. That is, disk sector writes are collected, and file updates are inferred therefrom, whereby file update operations within a virtual machine may be monitored outside the virtual machine without the need to run a special agent inside the virtual machine.

As described above, the previously proposed methods, such as file-system lookup methods and block-input/output-monitoring methods, compensate for the problems with the method using agents through hypervisor-level monitoring, but are disadvantageous in that monitoring cannot be performed in real time and in that the exposure of data through read access to a file cannot be monitored.

Furthermore, due to the presence of a disk cache within a virtual machine, some file data in storage are temporarily inconsistent with file data in memory, which may generate a blind spot in monitoring. More particularly, in regard to file data in a disk cache of memory managed by a guest OS within a virtual machine, an existing disk I/O monitoring method cannot detect whether or not data are changed until block I/O is performed in order to clear the changed data from the cache and to write the same to nonvolatile storage. Also, prefetching data to a disk cache does not always mean actual data access, and because access to file data in a disk cache does not generate a block I/O request, the hypervisor cannot catch such access. Therefore, it is inappropriate to use block I/O monitoring for the purpose of monitoring file access.

The above-described information about the related art has been retained by the inventors for the purpose of developing the present invention or was obtained during the process of developing the present invention. Also, it should be appreciated that this information did not necessarily belong to the public domain before the patent filing date of the present invention.

DOCUMENTS OF RELATED ART (Patent Document 1) Korean Patent No. 10-1673774.

SUMMARY OF THE INVENTION

An object of the present invention is to provide an apparatus and method for monitoring file access in a virtual machine, through which access to file data, loaded from nonvolatile storage to memory, is monitored by a hypervisor, whereby file access by a task context that is not allowed to access a file is detected, and a suitable measure is taken in response thereto.

Another object of the present invention is to provide an apparatus and method for monitoring file access in a virtual machine, in which file access by a task that is not allowed to access the file is monitored in real time, but the performance load caused by real-time monitoring may be reduced.

An embodiment of the present invention provides an apparatus for monitoring file access in a virtual machine in a cloud-computing system based on a virtualized environment, the apparatus including a hypervisor for implementing at least one virtual machine and managing the virtual machine by monitoring a task in which the virtual machine accesses a file loaded from storage to memory, the storage storing data including environment information of the virtual machine.

Here, the hypervisor may include a task identifier for creating task identification information for the task and determining whether the task is a new task using the task identification information; and a decision module for deciding whether to allow the task using a whitelist including preset task identification information and information about a file to which access is allowed.

Here, the hypervisor may further include an I/O information analyzer for collecting information about a location at which a requested file is stored in the storage and a page frame number of memory included in a disk cache, to which the requested file is loaded, by analyzing input/output requests related to the storage, which are created by and delivered from an operating system in the virtual machine; a file information extractor for extracting semantic information about the file using the page frame number or the information about the location of the file in the storage and adding the page frame number and file information corresponding to the semantic information to monitoring metadata connected with a corresponding page frame; and a disk cache access detector for acquiring task identification information of a task in response to occurrence of an event in which the page frame included in the disk cache is accessed by the task and creating event information about the event.

Here, the hypervisor may further include a system call invocation detector for detecting a system call invoked by the task, acquiring system call arguments that are input when the task invokes the system call by monitoring a system call table, and thereby acquiring file information of a file to which access is attempted by the task, wherein the decision module may allow access by the task when the task identification information of the task and the file information of the file to which access is attempted by the task are included in the whitelist.

Here, the decision module may perform a preset operation for the task when the task identification information and the file information are not included in the whitelist.

Here, the preset operation may be forcibly terminating the task.

Here, the task identifier may create simplified task identification information for the task using only a register value of a core on which the task is running or using a combination of the register value and a path of a source image file of the task, and the decision module may decide whether to allow access by the task using an index table created based on the simplified task identification information and simplified file information specifying a file to which access is attempted by the task.

Here, the system call invocation detector may store file information acquired from the system call arguments in a metadata area of the page frame in which data, loaded by invoking the system call, are stored.

Here, the sematic information may be acquired by backtracking metadata information of the disk cache using the information about the location of the file in the storage.

Here, the semantic information may be acquired by extracting file information from the system call arguments using the information about the location of the file in the storage.

Another embodiment of the present invention provides a method for monitoring file access in a virtual machine in a cloud-computing system based on a virtualized environment, the method including implementing at least one virtual machine; and managing the virtual machine by monitoring a task in which the virtual machine accesses a file loaded from storage to memory, the storage storing data including environment information of the virtual machine.

Here, managing the virtual machine may include creating task identification information for the task; determining whether the task is a new task using the task identification information; and deciding whether to allow the task using a whitelist, including preset task identification information and information about a file to which access is allowed.

Here, managing the virtual machine may further include collecting information about a location at which a requested file is stored in the storage and a page frame number of memory included in a disk cache, to which the requested file is loaded, by analyzing input/output requests related to the storage, which are created by and delivered from an operating system in the virtual machine; extracting semantic information about the file using the page frame number or the information about the location of the file in the storage and adding the page frame number and file information corresponding to the semantic information to monitoring metadata connected with a corresponding page frame; and acquiring task identification information of a task in response to occurrence of an event in which the page frame included in the disk cache is accessed by the task, and creating event information about the event.

Here, managing the virtual machine may further include detecting a system call invoked by the task, acquiring system call arguments that are input when the task invokes the system call by monitoring a system call table, and thereby acquiring file information of a file to which access is attempted by the task, wherein deciding whether to allow the task may be configured to allow access by the task when the task identification information of the task and file information of the file to which access is attempted by the task are included in the whitelist.

Here, deciding whether to allow the task may be configured to perform a preset operation for the task when the task identification information and the file information are not included in the whitelist.

Here, the preset operation may be forcibly terminating the task.

Here, creating the task identification information may be configured to create simplified task identification information for the task using only a register value of a core on which the task is running or using a combination of the register value and a path of a source image file of the task, and deciding whether to allow the task may be configured to decide whether to allow access by the task using an index table created based on the simplified task identification information and simplified file information specifying a file to which access is attempted by the task.

Here, acquiring the file information may configured to store file information acquired from the system call arguments in a metadata area of the page frame in which data, loaded by invoking the system call, are stored.

Here, the sematic information may be acquired by backtracking metadata information of the disk cache using the information about the location of the file in the storage.

Here, the semantic information may be acquired by extracting file information from the system call arguments using the information about the location of the file in the storage.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
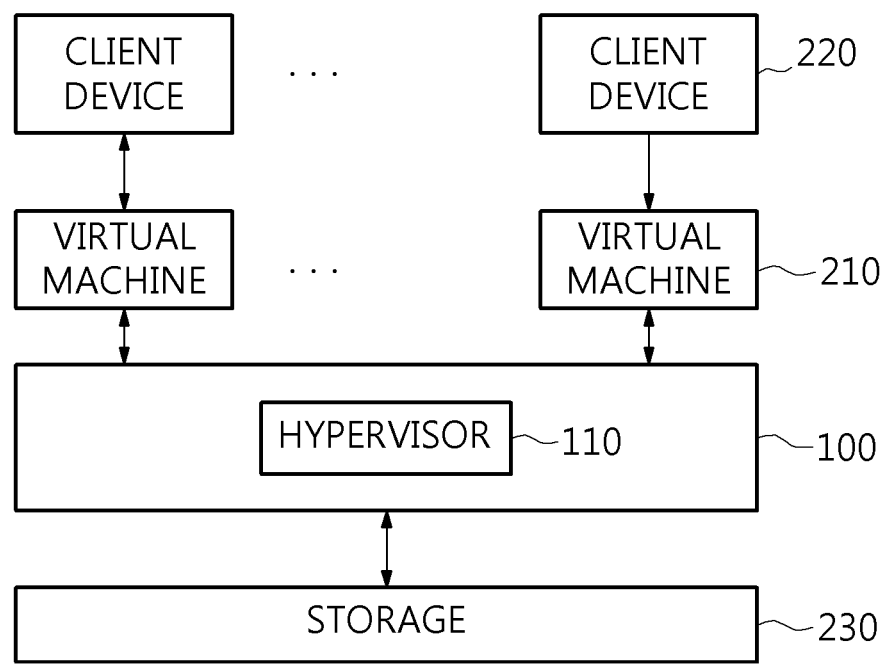
FIG. 1 is a view that shows the configuration of a system for monitoring file access in a virtual machine according to an embodiment of the present invention.

The present invention may be variously changed, and may have various embodiments, and specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Moreover, the present invention is not limited to the embodiments to be described below, but all or some of the embodiments may be selectively combined and configured, so that the embodiments may be modified in various ways. It will be understood that, although the terms "first," "second," etc. may be used herein to describe various elements, these elements are not intended to be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows the configuration of a system 1 for monitoring file access in a virtual machine according to an embodiment of the present invention.

Referring to FIG. 1, the system 1 for monitoring file access in a virtual machine according to an embodiment of the present invention includes an apparatus 100 for monitoring file access in a virtual machine, at least one virtual machine 210, at least one client device 220 that uses the virtual machine, storage 230, and the like.

Here, the apparatus 100 for monitoring file access in a virtual machine may include a hypervisor 110 for creating and managing a virtual machine, and the virtual machine 210 may be interconnected with the client device 220.

The hypervisor 110 is in a software layer for constructing a virtualized system, and is located between an Operating System (OS) and hardware. The hypervisor 110 may provide respective virtual machines with logically separated hardware. Also, the hypervisor 110 may be called a "Virtual Machine Monitor (VMM)", and may represent firmware or software for creating and running virtual machines.

Also, at least one virtual machine 210 may be run on the hypervisor 110. The virtual machine 210 may include an OS layer and an application layer.

Here, OS layers for the respective virtual machines may be independent of each other. That is, the hypervisor 110 may distribute resources in a hardware layer to virtual machines 210 such that the virtual machines 210 run independently of each other using the resources allocated thereto.

Also, the hypervisor 110 may process data input/output of each virtual machine using a disk image.

The storage 230 is storage for storing data, including virtual machine images, the environment information of virtual machines, and the like. The storage 230 may be nonvolatile storage.

The environment in which the present invention is applied is a virtualized environment in which one or more virtual machines (VMs) are running on a single hardware computer, and in which a memory page frame containing file data is tracked and monitored at the hypervisor level based on an agentless method in which no monitoring object is present in the virtual machine. Here, a task context that attempts to access a page frame is identified, and information about the file, the data of which are contained in the page frame to which access is attempted, is linked with the task context, whereby read/write access to file data is monitored in real time.

The process flow of the entire system may be summarized as follows. First, a page frame, included in a disk cache managed by a guest OS inside a virtual machine, is tracked. Then, an event in which a task attempts to access file data in the page frame is detected, the task that is attempting to access the file data is identified, and information about the file data to which access is being attempted is checked. Then, whether to allow the access is determined based on a whitelist, and a policy depending on the result of determination is executed or delivered.

Here, as the method for monitoring access to file data, there are two methods. In the first method, in order to reduce a semantic gap, sematic information about a file, to which access is attempted, is acquired by monitoring access using system calls. In the second method, semantic information about data to which access is attempted is acquired by directly monitoring access to memory, into which file data are loaded, and by backtracking the file system of a guest OS.

Here, an administrator may select any one of the two methods based on whether a cache is used in a virtual machine, such as write-through, write-back, or the like, a data access method, such as access from user space/kernel space, the purpose of monitoring, an acceptable monitoring load, a file access pattern, and a frequency with which a file is accessed.

Figure 2:
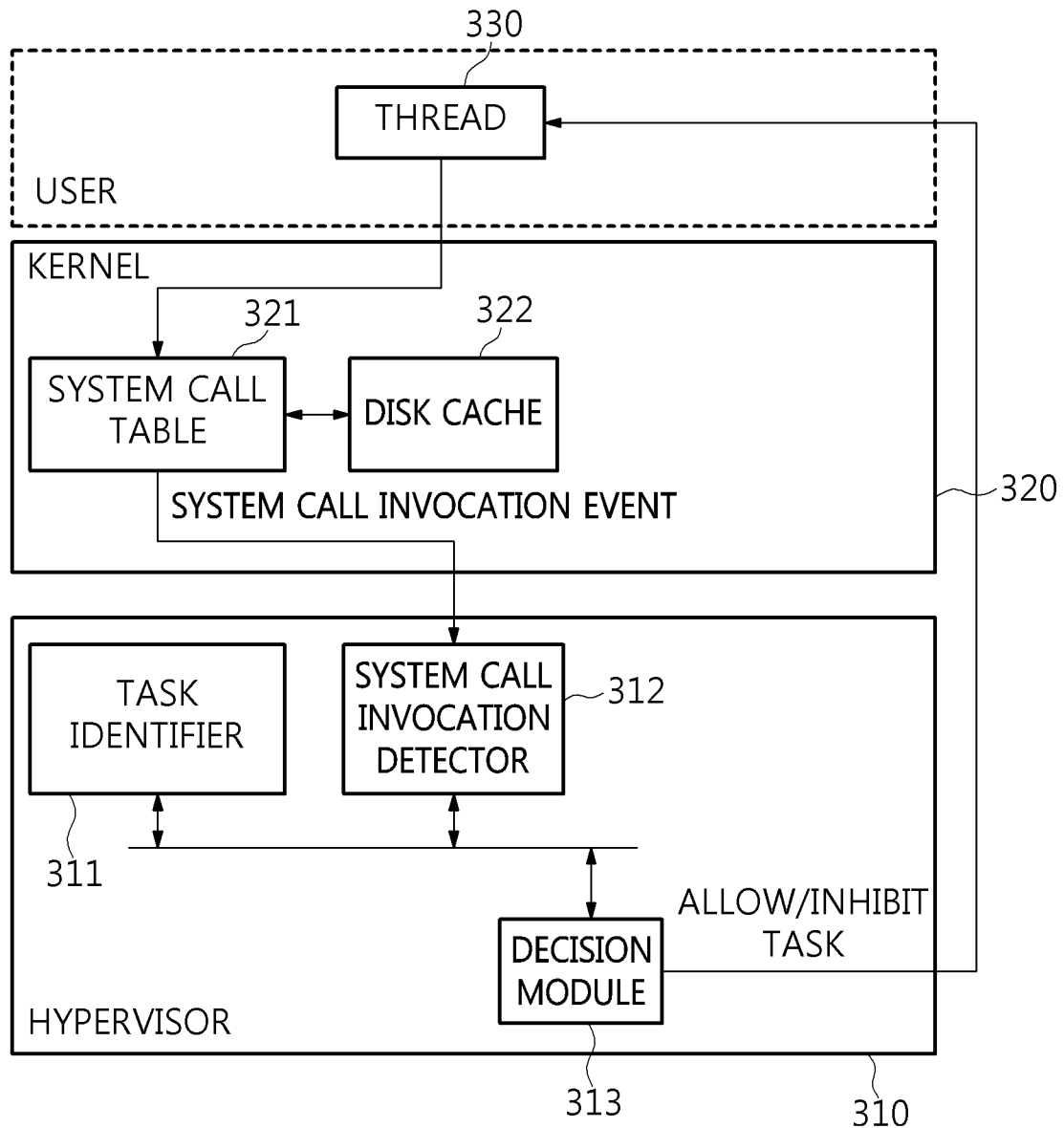
FIG. 2 is a view that shows an apparatus for monitoring file access in a virtual machine according to an embodiment of the present invention.

FIG. 2 is a view that shows an apparatus for monitoring file access in a virtual machine according to an embodiment of the present invention.

Specifically, a hypervisor 310 includes a task identifier 311, a system call invocation detector 312, a decision module 313, and the like.

The task identifier 311 identifies the task that is running on a CPU core in each processor and assigns task identification information (taskID) to each task, thereby managing the task.

Here, each task is identified based on a register value that points to the location of a page table used by the task, and the task identification information of the task may be created based on information about the source image file of the corresponding task.

Here, when an Intel processor is used, each task may be identified based on the CR3 register value.

Here, the task identification information may be used as a search key when the decision module 313 searches a whitelist for an entry corresponding to the task.

Here, a value that is not modified even in the event of rebooting, such as a fingerprint value of the source image file of a task, or the like, may be used as the task identification information of the task.

When the decision module 313 uses an index table for quick searching, simplified task identification information (short_taskID) may be created and used.

Here, the simplified task identification information (short_taskID) may be created using only the CR3 register value of the core on which the corresponding task is running, or using a combination of the CR3 register value and the full path of the source image file of the corresponding task.

The system call invocation detector 312 detects a system call invoked by a task inside a virtual machine and acquires the arguments of the system call that are input when the system call is invoked.

Here, the system call invocation detector 312 monitors a system call table 321, checks a system call by catching an event triggered when an arbitrary task invokes the system call, and reads the argument values of the system call from registers, stacks, and memory, thereby acquiring the absolute path of the file to which access is attempted by the user's task.

Here, the system call table may include Linux's syscall and Windows's System Service Dispatch Table (SSDT).

The decision module 313 receives information in which the task identification information, delivered from the task identifier 311, is linked with the path of the file to which access is attempted by the task, delivered from the system call invocation detector 312, and then checks whether the access is allowed by an administrator.

Here, using a whitelist written in advance by the administrator, whether an entry corresponding to the received information is present in the whitelist is checked, whereby whether to allow the corresponding task to access the file may be decided.

When the corresponding entry is present in the whitelist, the access is determined to be allowed. Accordingly, a thread 330 is made to perform the task, and no further operation is performed. However, when the corresponding entry is not present in the whitelist, an operation set by the administrator may be performed. For example, when it is determined that the access is not allowed, the thread 330 may be instructed to stop the execution of the task.

Here, the decision module 313 may create an index table, which is a cache table for searching. This is because, for every file access by a task, the decision module 313 decides whether to allow file access through searching and comparison, but the use of invariable task identification information and file information causes repeated execution of code that is necessary in order to create a key value and a comparison value, which results in cumulative performance degradation.

That is, in order to reduce the amount of time taken to create the task identification information of a running task and to search a whitelist for an entry corresponding to the task, the decision module 313 may create an index table based on simplified task identification information and simplified file information (short_file_information) and use the index table.

Here, the index table may contain entries, each of which includes a pair comprising <short_taskID, short_file_information>. Each entry may be created and added along with information about whether to allow file access when each task first accesses a file. Also, the value of the simplified file information may be created in a simplified information form through which the corresponding file may be specified. Here, the simplified task identification information may be created by the task identifier 311.

Figure 3:
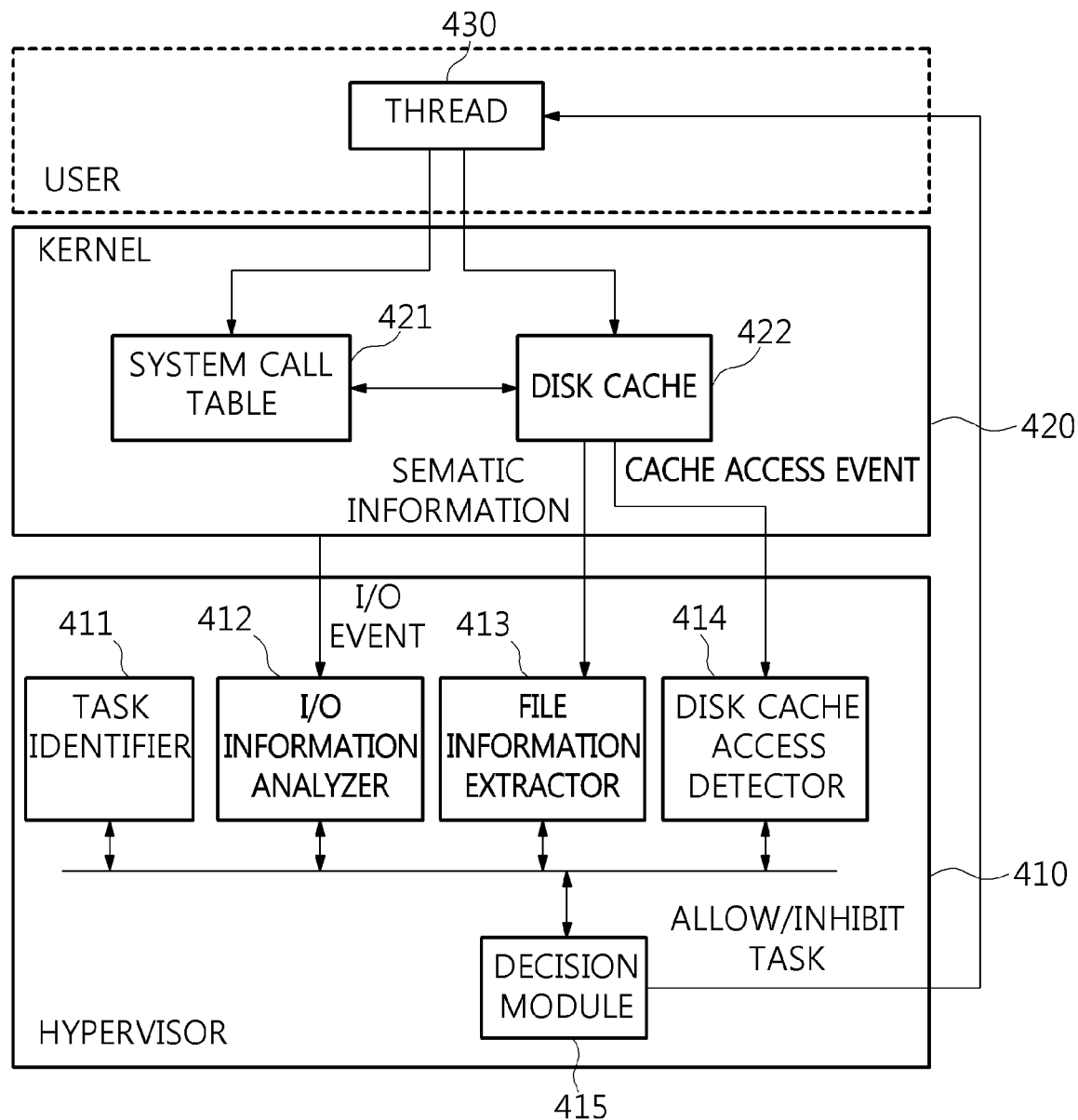
FIG. 3 is a view that shows an apparatus for monitoring file access in a virtual machine according to an embodiment of the present invention.

FIG. 3 is a view that shows an apparatus for monitoring file access in a virtual machine according to an embodiment of the present invention.

Specifically, the hypervisor 410 includes a task identifier 411, an I/O information analyzer 412, a file information extractor 413, a disk cache access detector 414, a decision module 415, and the like.

The task identifier 411 identifies the task that is running on a CPU core in each processor and assigns task identification information to each task, thereby managing the task.

Here, each task is identified based on a register value that points to the location of a page table used by the task, and the task identification information of the task may be created based on information about the source image file of the corresponding task.

Here, when an Intel processor is used, each task may be identified based on the CR3 register value.

Here, the task identification information may be used as a search key when the decision module 415 searches a whitelist for an entry corresponding to the task.

Here, a value that is not modified even in the event of rebooting, such as a fingerprint value of the source image file of a task, or the like, may be used as the task identification information of the task.

When the decision module 415 uses an index table for quick searching, simplified task identification information (short_taskID) may be created and used.

Here, the simplified task identification information may be created using only the CR3 register value of the core on which the corresponding task is running, or using a combination of the CR3 register value and the full path of the source image file of the corresponding task.

The I/O information analyzer 412 analyzes a storage input/output request made by and delivered from an OS within the virtual machine.

Here, the storage input/output request may include Linux's Block I/O (BIO) and Windows's I/O Request Packets (IRP).

Here, the I/O information analyzer 412 may be configured with an I/O request monitor and an I/O completion handler monitor.

Here, using information acquired through successive execution of the I/O request monitor and the I/O completion handler monitor, information about the location at which data accessed by an arbitrary task are stored in storage and the page frame into which the corresponding data are loaded may be acquired. Here, in response to each I/O request, the I/O request monitor and the I/O completion handler monitor are operated in the order in which they are listed.

The I/O request monitor links the task identification information of the task that made the I/O request with the I/O request in order to enable memory, into which data are to be loaded in response to the I/O request made by the task, to be tracked based on the task. Then, the I/O request monitor acquires the memory address of the I/O request, which is created when a function call is completed, by monitoring whether the function for creating an I/O request (for example, BIO, IRP, or the like) in a kernel 420 is used, and parses the acquired memory address using a known object structure, thereby detecting the location of the I/O completion handler associated with the I/O request. The detected location is delivered to the I/O completion handler monitor in order to monitor whether the I/O completion handler is used.

For the I/O requests, the monitoring of which is instructed by the I/O request monitor, the I/O completion handler monitor receives the location of a function that is called when I/O is completed, and then detects the call to the function by monitoring the same. The I/O completion handler monitor acquires the address of page frames, into which file data are loaded in response to the I/O request, treats these page frames as page frames included in a disk cache 422, and manages the page frames on a per-virtual-machine basis.

Here, when it is detected that a page frame that is being used as a disk cache is no longer being used as a disk cache because the OS of the virtual machine reclaims the page frame, monitoring of the page frame may be stopped, and relevant metadata linked with the page frame may be deleted. Here, whether the managed page frame is reclaimed may be determined in such a way that, when the path along which the page frame is accessed is not a file system access interface, the page frame is regarded as being reclaimed and is thus excluded from the management target.

The file information extractor 413 creates information about a file, the data of which are stored at a specific memory address, in the form of <PFN, file_information> by combining file-system-level sematic information about the data stored in memory within the disk cache 422 with the Page Frame Number (PFN) of the memory in which the data are stored. Here, the page frame number of the memory in which the data are stored may be acquired from the I/O information analyzer 412.

Here, the semantic information about the data stored in the used memory may be acquired by associating information about the location at which the data are stored in the storage, which is acquired by the I/O information analyzer 412, with the file information in the system call arguments.

Here, the semantic information about the data stored in the used memory may be acquired by backtracking metadata information of the disk cache by parsing the metadata of the target file system using the information about the location at which the data are stored in the storage, which is acquired by the I/O information analyzer 412.

When an event in which the page frame included in the disk cache 422 is accessed by a task has occurred, the disk cache access detector 414 creates <taskID, PFN> by acquiring the task identification information (taskID) of the task from the task identifier 411 and creates access event information using the created <taskID, PFN>.

Here, when the disk cache 422 is directly accessed, event information in the form of <taskID, PFN, file_information> or <taskID, file_information> may be created using <PFN, file_information> of the corresponding page frame, which is previously collected and stored by the I/O information analyzer 412.

As described above, the event information created by the disk cache access detector 414 is sent to the decision module 415, whereby the validity of the access may be determined before actual access takes place. Here, the file information to be used may be the absolute path of the file in the file system, or may have a different form.

The decision module 415 receives information in which the task identification information is linked with the path of the accessed file and checks whether the access by the task is allowed by an administrator.

Here, using a whitelist written in advance by the administrator, whether an entry corresponding to the received information is present in the whitelist is checked, whereby whether to allow the corresponding task to access the file may be decided.

When the corresponding entry is present in the whitelist, the access is determined to be allowed. Accordingly, a thread 430 is made to perform the task, and no further operation is performed. However, when the corresponding entry is not present in the whitelist, an operation set by the administrator may be performed. For example, when it is determined that the access is not allowed, the thread 430 may be instructed to stop the execution of the task.

Here, the decision module 415 may create an index table, which is a cache table for searching. This is because, for every file access by a task, the decision module 415 decides whether to allow file access through searching and comparison, but the use of invariable task identification information and file information causes repeated execution of code that is necessary in order to create a key value and a comparison value, which results in cumulative performance degradation.

That is, in order to reduce the amount of time taken to create the task identification information of a running task and to search a whitelist for an entry corresponding to the task, the decision module 415 may create an index table based on simplified task identification information and simplified file information (short_file_information) and use the index table.

Here, the index table may contain entries, each of which includes a pair comprising <short_taskID, short_file_information>. Each entry may be created and added along with information about whether to allow file access when each task first accesses a file. Also, the value of the simplified file information may be created in a simplified information form through which the corresponding file may be specified. Here, the simplified task identification information may be created by the task identifier 411.

Figure 4:
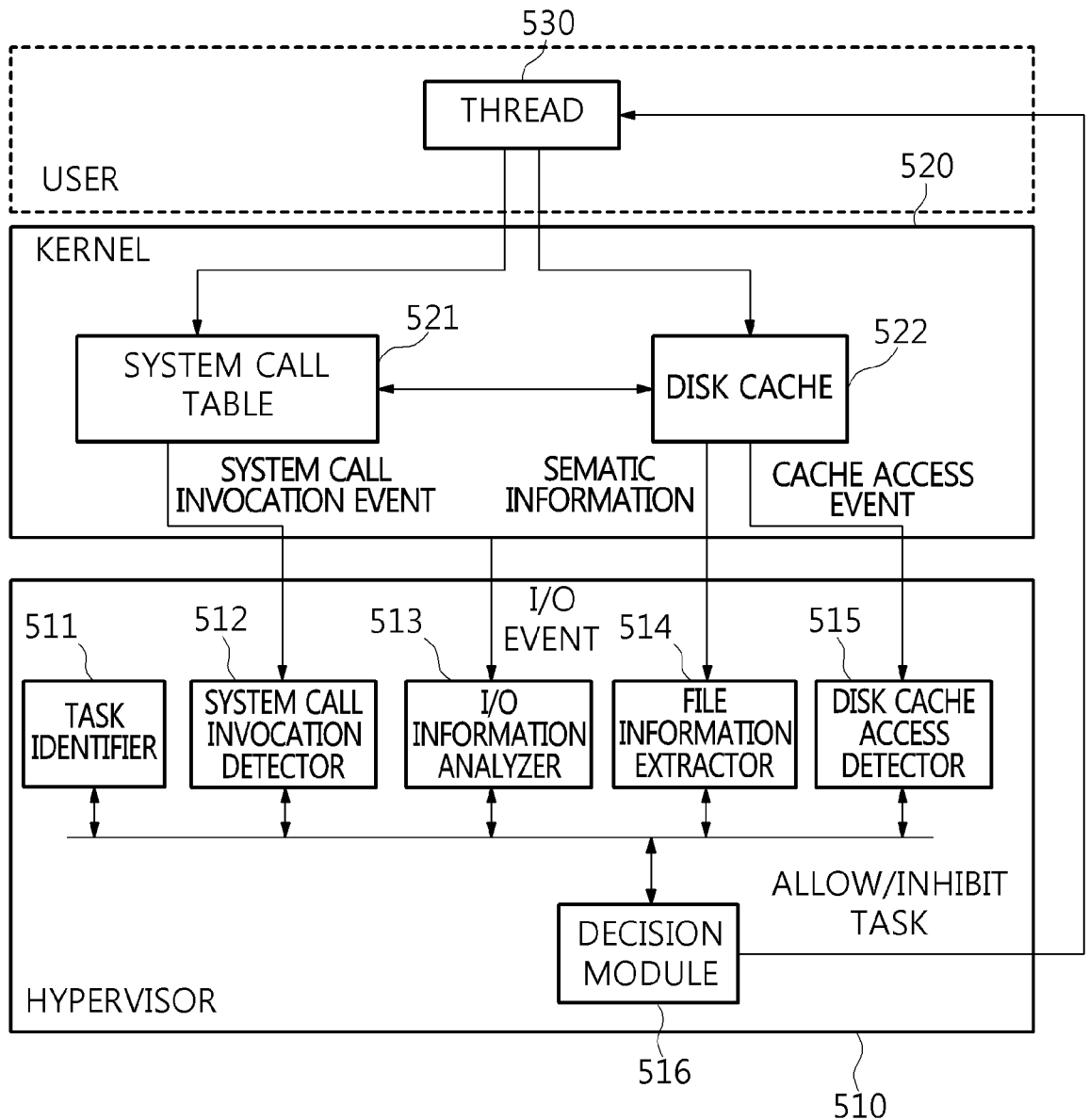
FIG. 4 is a view that shows an apparatus for monitoring file access in a virtual machine according to an embodiment of the present invention.

FIG. 4 is a view that shows an apparatus for monitoring file access in a virtual machine according to an embodiment of the present invention.

Specifically, the hypervisor 510 includes a task identifier 511, a system call invocation detector 512, an I/O information analyzer 513, a file information extractor 514, a disk cache access detector 515, a decision module 516, and the like.

The task identifier 511 identifies the task that is running on a CPU core in each processor and assigns task identification information to each task, thereby managing the task.

Here, each task is identified based on a register value that points to the location of a page table used by the task, and the task identification information of the task may be created based on information about the source image file of the corresponding task.

Here, when an Intel processor is used, each task may be identified based on the CR3 register value.

Here, the task identification information may be used as a search key when the decision module 516 searches a whitelist for an entry corresponding to the task.

Here, a value that is not modified even in the event of rebooting, such as a fingerprint value of the source image file of a task, or the like, may be used as the task identification information of the task.

When the decision module 516 uses an index table for quick searching, simplified task identification information (short_taskID) may be created and used.

Here, the simplified task identification information may be created using only the CR3 register value of the core on which the corresponding task is running, or using a combination of the CR3 register value and the full path of the source image file of the corresponding task.

The system call invocation detector 512 detects a system call invoked by a task inside a virtual machine and acquires the arguments of the system call that are input when the system call is invoked.

Here, the system call invocation detector 512 monitors a system call table 521, checks a system call by catching an event triggered when an arbitrary task invokes the system call, and reads the argument values of the system call from registers, stacks, and memory, thereby acquiring the absolute path of the file to which access is attempted by the user's task.

Here, the system call table may include Linux's syscall and Windows's SSDT.

The I/O information analyzer 513 analyzes a storage input/output request made by and delivered from an OS within the virtual machine.

Here, the storage input/output request may include Linux's BIO and Windows's IRP.

Here, the I/O information analyzer 513 may be configured with an I/O request monitor and an I/O completion handler monitor.

Here, using information acquired through successive execution of the I/O request monitor and the I/O completion handler monitor, information about the location at which data accessed by an arbitrary task are stored in storage and the page frame into which the corresponding data are loaded may be acquired. Here, in response to each I/O request, the I/O request monitor and the I/O completion handler monitor are operated in the order in which they are listed.

The I/O request monitor links the task identification information of the task that made the I/O request with the I/O request in order to enable memory, into which data are to be loaded in response to the I/O request made by the task, to be tracked based on the task. Then, the I/O request monitor acquires the memory address of the I/O request, which is created when a function call is completed, by monitoring whether the function for creating an I/O request (for example, BIO, IRP, or the like) in a kernel 520 is used, and parses the acquired memory address using a known object structure, thereby detecting the location of the I/O completion handler associated with the I/O request. The detected location of the I/O completion handler is delivered to the I/O completion handler monitor in order to monitor whether the I/O completion handler is used.

For the I/O requests, the monitoring of which is instructed by the I/O request monitor, the I/O completion handler monitor receives the location of a function that is called when I/O is completed, and then detects the call to the function by monitoring the same. The I/O completion handler monitor acquires the address of page frames, into which file data are loaded in response to the I/O request, treats these page frames as page frames included in a disk cache 522, and manages the page frames on a per-virtual-machine basis.

Here, when it is detected that a page frame that is being used as a disk cache is no longer being used as a disk cache because the OS of the virtual machine reclaims the page frame, monitoring of the page frame may be stopped, and relevant metadata linked with the page frame may be deleted. Here, whether the managed page frame is reclaimed may be determined in such a way that, when the path along which the page frame is accessed is not a file system access interface, the page frame is regarded as being reclaimed and is thus excluded from the management target.

The file information extractor 514 creates information about a file, the data of which are stored at a specific memory address, in the form of <PFN, file_information> by combining file-system-level sematic information about the data stored in memory within the disk cache 522 with the Page Frame Number (PFN) of the memory in which the data are stored. Here, the page frame number of the memory in which the data are stored may be acquired from the I/O information analyzer 513.

Here, the semantic information about the data stored in the used memory may be acquired by associating information about the location at which the data are stored in the storage, which is acquired by the I/O information analyzer 513, with the file information in the system call arguments.

Here, the semantic information about the data stored in the used memory may be acquired by backtracking metadata information of the disk cache by parsing the metadata of the target file system using the information about the location at which the data are stored in the storage, which is acquired by the I/O information analyzer 513.

When an event in which the page frame included in the disk cache 522 is accessed by a task has occurred, the disk cache access detector 515 creates <taskID, PFN> by acquiring the task identification information (taskID) of the task from the task identifier 511 and creates access event information using the created <taskID, PFN>.

Here, when access is attempted through the invocation of a system call, arguments of the system call are collected from the system call invocation detector 512, and event information in the form of <taskID, file_information> may be created.

Here, when the disk cache 522 is directly accessed, event information in the form of <taskID, PFN, file_information> or <taskID, file_information> may be created using <PFN, file_information> of the corresponding page frame, which is previously collected and stored by the I/O information analyzer 513.

As described above, the event information created by the disk cache access detector 515 is sent to the decision module 516, whereby the validity of the access may be determined before actual access takes place. Here, the file information to be used may be the absolute path of the file in the file system, or may have a different form.

The decision module 516 receives information in which the task identification information is linked with the path of the accessed file and checks whether the access by the task is allowed by an administrator.

Here, using a whitelist written in advance by the administrator, whether an entry corresponding to the received information is present in the whitelist is checked, whereby whether to allow the corresponding task to access the file may be decided.

When the corresponding entry is present in the whitelist, the access is determined to be allowed. Accordingly, a thread 530 is made to perform the task, and no further operation is performed. However, when the corresponding entry is not present in the whitelist, an operation set by the administrator may be performed. For example, when it is determined that the access is not allowed, the thread 530 may be instructed to stop the execution of the task.

Here, the decision module 516 may create an index table, which is a cache table for searching. This is because, for every file access by a task, the decision module 516 decides whether to allow file access through searching and comparison, but the use of invariable task identification information and file information causes repeated execution of code that is necessary in order to create a key value and a comparison value, which results in cumulative performance degradation.

That is, in order to reduce the amount of time taken to create the task identification information of a running task and to search a whitelist for an entry corresponding to the task, the decision module 516 may create an index table based on simplified task identification information and simplified file information (short_file_information) and use the index table.

Here, the index table may contain entries, each of which includes a pair comprising <short_taskID, short_file_information>. Each entry may be created and added along with information about whether to allow file access when each task first accesses a file. Also, the value of the simplified file information may be created in a simplified information form through which the corresponding file may be specified. Here, the simplified task identification information may be created by the task identifier 511.

Figure 5:
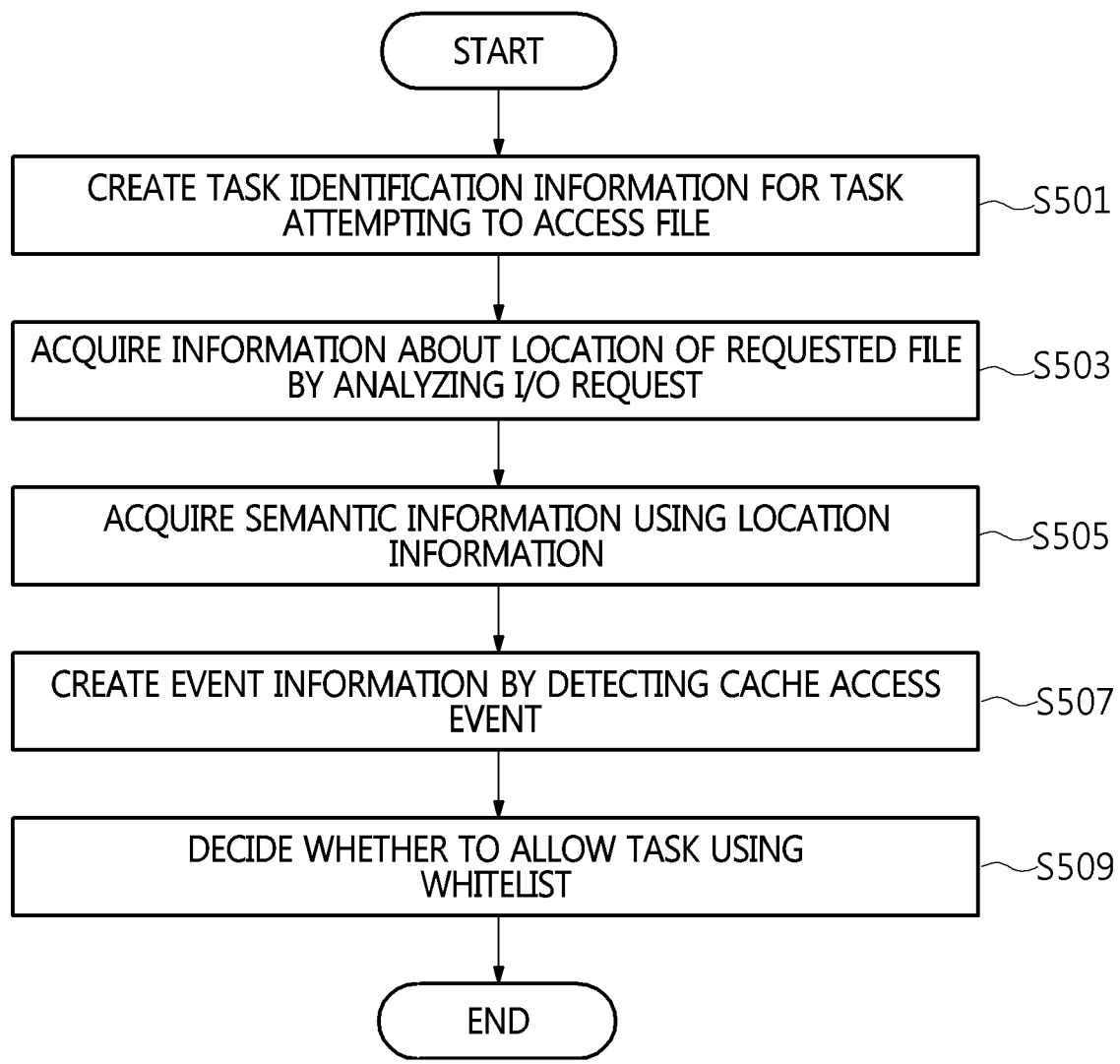
FIG. 5 is a flowchart that shows a method for monitoring file access in a virtual machine according to an embodiment of the present invention.

FIG. 5 is a flowchart that shows a method for monitoring file access in a virtual machine according to an embodiment of the present invention.

FIG. 5 shows a method for monitoring file access in a virtual machine that includes components for monitoring access to a disk cache.

Referring to FIG. 5, in the method for monitoring file access in a virtual machine according to an embodiment of the present invention, when a new task first accesses a file, task identification information of the task is created at step S501.

Here, the presence of the new task may be checked depending on whether a process having a CR3 register value that is the same as the CR3 register value of the target process running in each virtual machine is registered in a list of tasks for each virtual machine or on whether already created task identification information is present.

Here, the task identification information may include a task ID (taskID) that is created using the page table address of the task, represented as the CR3 register value.

Here, the task identification information may be created using information about a virtual machine in which a target program is included, the path of an executable file, the hash value of an image file, and the like.

If it is necessary to distinguish threads having the same CR3 value, an entry for each process is retrieved from a process management data structure of a guest OS, an identifier for identifying each thread (for example, thread ID) is retrieved from the corresponding entry, and a combination of the thread ID and the CR3 register value may be used as an ID.

Here, the time at which the creation of task identification information is required and the target task may be determined based on the process that attempts to access at the time of occurrence of an attempt to access a page frame of a disk cache that is being monitored and based on the process that invokes a system call at the time of occurrence of an attempt to access file data through the system call.

Also, in the method for monitoring file access in a virtual machine according to an embodiment of the present invention, storage I/O requests made by tasks in the virtual machine are tracked, and an event of calling an I/O completion handler associated with the request is detected, whereby information about the location of the requested file and the page frame number (PFN) of memory included in the disk cache, into which the data of the corresponding file are loaded, is collected and managed for each virtual machine at step S503.

Here, the location information may include a sector number, an offset, and the like in the storage.

Also, in the method for monitoring file access in a virtual machine according to an embodiment of the present invention, based on <PFN, location_information>, sematic information (the absolute path of a file, or the like) about a file, the data of which are stored in the page frame included in the disk cache, is extracted from the file system of the guest OS in the virtual machine. The extracted information is added in the form of <PFN, file_information> to monitoring metadata connected with the page frame, and is managed by the hypervisor at step S505.

Also, in the method for monitoring file access in a virtual machine according to an embodiment of the present invention, when a task accesses the page frame included in the disk cache, the corresponding event is detected, and the task identification information of the task that created the event is acquired, whereby event information, such as <taskID, PFN, file_information> or <taskID, file_information>, is created at step S507.

Also, in the method for monitoring file access in a virtual machine according to an embodiment of the present invention, using <taskID, file information>, which is created by the hypervisor, as a search key, whether the corresponding entry is present in a whitelist is checked, and whether to allow the task to access the file is determined at step S509 depending on whether the corresponding entry is present in the whitelist.

If the corresponding entry is present in the whitelist, because the access by the task is determined to be allowed, access by the task is allowed, and no further operation is performed. However, if the corresponding entry is not present in the whitelist, because the task is not allowed to access the file, a preset operation may be performed.

Here, execution of the task that is not allowed to gain access may be forcibly terminated.

Here, the whitelist may be created in advance by an administrator in the form of a list of entries, each of which is <taskID, information about a file to which access is allowed>.

Figure 6:
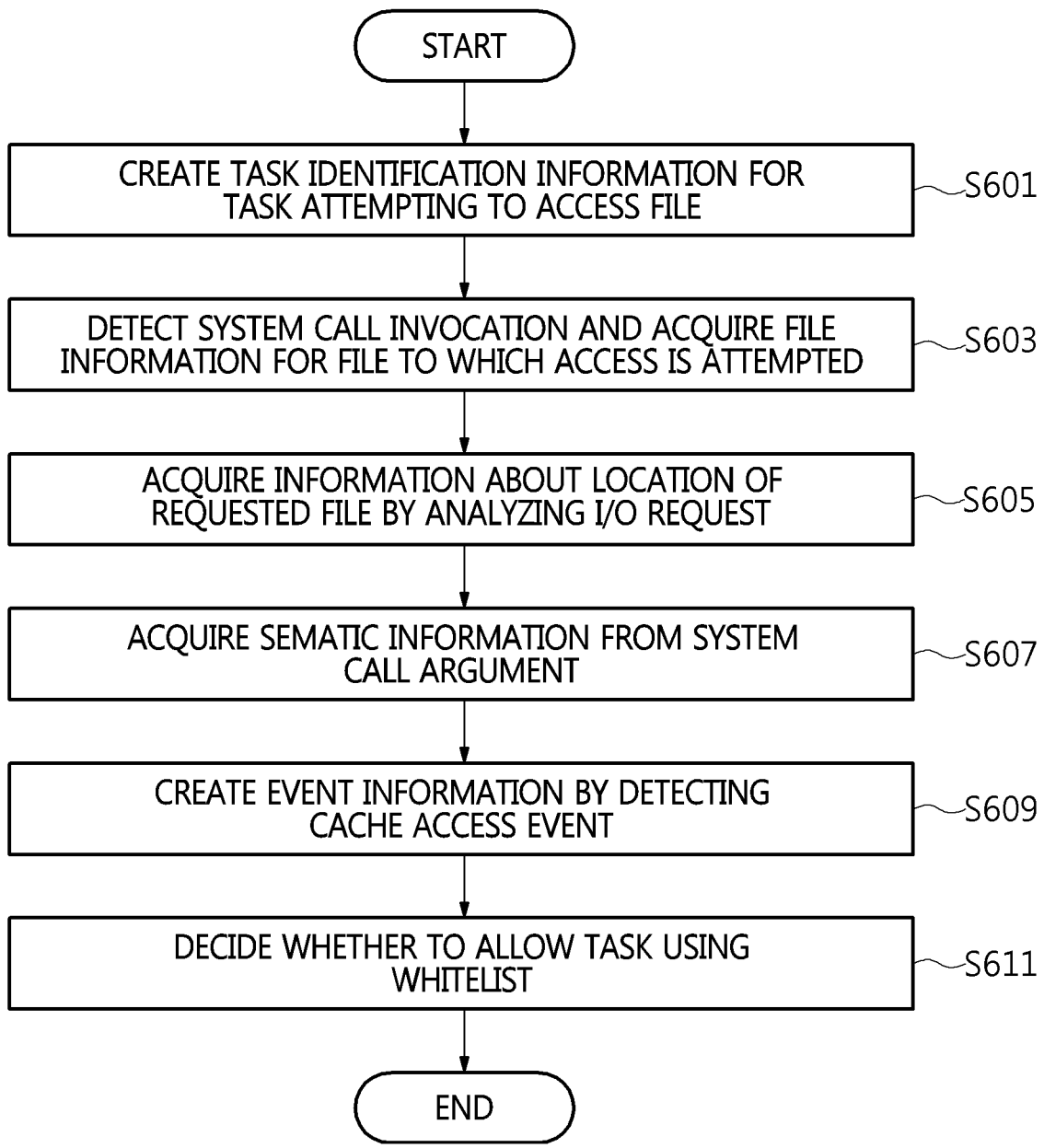
FIG. 6 is a flowchart that shows a method for monitoring file access in a virtual machine according to an embodiment of the present invention.

FIG. 6 is a flowchart that shows a method for monitoring file access in a virtual machine according to an embodiment of the present invention.

FIG. 6 shows a method for monitoring file access in a virtual machine that includes components for monitoring all file access in the virtual machine by detecting both invocation of system calls and access to a disk cache.

Referring to FIG. 6, in the method for monitoring file access in a virtual machine according to an embodiment of the present invention, when a new task first accesses a file, task identification information of the task is created at step S601.

Here, the presence of the new task may be checked depending on whether a process having a CR3 register value that is the same as the CR3 register value of the target process running in each virtual machine is registered in a list of tasks for each virtual machine or on whether already created task identification information is present.

Here, the task identification information may include a task ID (taskID) that is created using the page table address of the task, represented as the CR3 register value.

Here, the task identification information may be created using information about a virtual machine in which a target program is included, the path of an executable file, the hash value of an image file, and the like.

If it is necessary to distinguish threads having the same CR3 value, an entry for each process is retrieved from a process management data structure of a guest OS, an identifier for identifying each thread (for example, thread ID) is retrieved from the corresponding entry, and a combination of the thread ID and the CR3 register value may be used as an ID.

Here, the time at which the creation of task identification information is required and the target task may be determined based on the process that attempts to access at the time of occurrence of an attempt to access a page frame of a disk cache that is being monitored and based on the process that invokes a system call at the time of occurrence of an attempt to access file data through the system call.

Also, in the method for monitoring file access in a virtual machine according to an embodiment of the present invention, invocation of system calls, such as open( ) read( ) write ( ) close( ) and the like for the file accessed by the task that is being monitored, is detected, and the argument values input when the system call is invoked are extracted, whereby information about the file to which access is attempted is acquired at step S603.

Here, the hypervisor may create a search key, such as <taskID, PathName> or <taskID, file_information>, by connecting the acquired file information with the ID of the target task.

Here, the input argument values may be read from registers, stack frames, or specially allocated memory depending on the implementation of the guest OS.

Here, if necessary, the file information extracted from the argument values of the system call may be stored in the metadata area of the page frame in which data loaded by invoking the corresponding system call are stored.

Also, in the method for monitoring file access in a virtual machine according to an embodiment of the present invention, storage I/O requests made by tasks in the virtual machine are tracked, and an event of calling an I/O completion handler associated with the request is detected, whereby information about the location of the requested file and the page frame number (PFN) of memory included in the disk cache, into which the data of the corresponding file are loaded, is collected and managed for each virtual machine at step S605.

Here, the location information may include a sector number, an offset, and the like in the storage.

Also, in the method for monitoring file access in a virtual machine according to an embodiment of the present invention, sematic information is extracted from the argument values of a system call for loading stored data at a page frame, corresponding to a page frame number, the sematic information is added in the form of <PFN, file_information> to monitoring metadata, which are connected with the corresponding page frame, and the semantic information is managed by the hypervisor at step S607.

When there is no information connected with data, that is, when no information is extracted from system call argument values because the data are loaded by being prefetched, sematic information (the absolute path of a file, or the like) about a file, the data of which are stored in a page frame included in the disk cache, is extracted from the file system of the guest OS in the virtual machine based on the acquired <PFN, location_information>, and the extracted semantic information is added in the form of <PFN, file_information> to monitoring metadata, which are connected with the corresponding page frame, and managed by the hypervisor.

Also, in the method for monitoring file access in a virtual machine according to an embodiment of the present invention, when a task accesses the page frame included in the disk cache, the corresponding event is detected, and the task identification information of the task that created the event is acquired, whereby event information, such as <taskID, PFN, file_information> or <taskID, file_information>, is created at step S609.

Also, in the method for monitoring file access in a virtual machine according to an embodiment of the present invention, using <taskID, file_information>, which is created by the hypervisor, as a search key, whether the corresponding entry is present in a whitelist is checked, and whether to allow the task to access the file is determined at step 611 depending on whether the corresponding entry is present in the whitelist.

If the corresponding entry is present in the whitelist, because the access by the task is determined to be allowed, access by the task is allowed, and no further operation is performed. However, if the corresponding entry is not present in the whitelist, because the task is not allowed to access the file, a preset operation may be performed.

Here, execution of the task that is not allowed to gain access may be forcibly terminated.

Here, the whitelist may be created in advance by an administrator in the form of a list of entries, each of which is <taskID, information about a file to which access is allowed>.

The above-described embodiment of the present invention may be implemented as program instructions executable by various computer devices, and may be recorded in computer-readable storage media. The computer-readable storage media may separately or collectively include program instructions, data files, data structures, and the like. The program instructions recorded in the media may be specially designed and configured for the embodiment, or may be available by being well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like; that is, a hardware device specially configured for storing and executing program instructions. Examples of the program instructions include not only machine code made by a compiler but also high-level language code executable by a computer using an interpreter. The above-mentioned hardware device may be configured such that it operates as one or more software modules in order to perform the operations of the embodiment and vice-versa.

According to the present invention, through the apparatus and method for monitoring file access in a virtual machine, access to file data loaded from nonvolatile storage to memory is monitored by a hypervisor, whereby file access by task context that is not allowed to access a file is detected, and a suitable measure is taken in response thereto. Accordingly, the problem in which an attempt to access an already loaded file is not detected through storage I/O monitoring may be solved, and data security may be improved.

Also, through the apparatus and method for monitoring file access in a virtual machine, the present invention monitors file access by a task that is not allowed to access a file in real time, but reduces the performance load caused by real-time monitoring, whereby the total system load caused by monitoring may be reduced.

Also, through the apparatus and method for monitoring file access in a virtual machine, the present invention overcomes a sematic gap between the inside and the outside of a virtual machine by hooking system calls and tapping memory cache input/output, and combines information acquired by hooking a system call with task context at the time of invoking the system call. Accordingly, when an arbitrary process attempts to access a file, to which access is not allowed, through read/write operations in a virtual machine, a hypervisor may detect such an attempt without installing any module in the virtual machine, decide whether to approve or deny the attempt, and take a suitable measure in response thereto. Accordingly, when application-level malware or a kernel rootkit attempts to access data, to which the access is not allowed, in a virtual machine, such an attempt may be defeated, whereby the security of the virtual machine may be improved.

Although specific embodiments have been described in the specification, they do not limit the scope of the present invention. For the conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, corresponding components may not be absolutely necessary.

Accordingly, the spirit of the present invention should not be construed as being limited to the above-described embodiments, and the entire scope of the appended claims and their equivalents will fall within the scope and spirit of the present invention.

What is claimed is:

1. An apparatus for monitoring file access in a virtual machine in a cloud-computing system based on a virtualized environment, comprising:
   a hypervisor which is configured to implement at least one virtual machine and to manage the virtual machine by monitoring a task of the virtual machine, the task running on a CPU core in a processor and attempting to access a file loaded from a storage to memory,
   wherein the memory is included in a disk cache configured to be managed by an operating system within the virtual machine, and the storage is configured to store data including environment information of the virtual machine.

2. The apparatus of claim 1, wherein the hypervisor comprises:
   a task identifier configured to create task identification information for the task and to determine whether the task is a new task using the task identification information; and
   a decision module configured to decide whether to allow the task using a whitelist including preset task identification information and information about a file to which access is allowed.

3. The apparatus of claim 2, wherein the hypervisor further comprises:
   an I/O information analyzer configured to collect information about a location at which a requested file is stored in the storage and a page frame number of memory included in a disk cache, to which the requested file is loaded, by analyzing input/output requests related to the storage, which are created by and delivered from an operating system in the virtual machine;
   a file information extractor configured to extract semantic information about the file using the page frame number or the information about the location of the file in the storage, and to add the page frame number and file information corresponding to the semantic information to monitoring metadata connected with a corresponding page frame; and
   a disk cache access detector configured to acquire task identification information of a task in response to occurrence of an event in which the page frame included in the disk cache is accessed by the task, and to create event information about the event.

4. The apparatus of claim 3, wherein:
   the hypervisor further comprises a system call invocation detector for detecting a system call invoked by the task, acquiring system call arguments that are input when the task invokes the system call by monitoring a system call table, and thereby acquiring file information of a file to which access is attempted by the task, and
   the decision module allows access by the task when the task identification information of the task and the file information of the file to which access is attempted by the task are included in the whitelist.

5. The apparatus of claim 4, wherein the decision module performs a preset operation for the task when the task identification information and the file information are not included in the whitelist.

6. The apparatus of claim 5, wherein the preset operation is forcibly terminating the task.

7. The apparatus of claim 6, wherein:
the task identifier creates simplified task identification information for the task using only a register value of a core on which the task is running or using a combination of the register value and a path of a source image file of the task, and
the decision module decides whether to allow access by the task using an index table created based on the simplified task identification information and simplified file information specifying a file to which access is attempted by the task.

8. The apparatus of claim 7, wherein the system call invocation detector stores file information acquired from the system call arguments in a metadata area of the page frame in which data, loaded by invoking the system call, are stored.

9. The apparatus of claim 8, wherein the sematic information is acquired by backtracking metadata information of the disk cache using the information about the location of the file in the storage.

10. The apparatus of claim 8, wherein the semantic information is acquired by extracting file information from the system call arguments using the information about the location of the file in the storage.

11. A method for monitoring file access in a virtual machine in a cloud-computing system based on a virtualized environment, comprising:
implementing at least one virtual machine; and
managing the virtual machine by monitoring a task of the virtual machine, the task running on a CPU core in a processor and attempting to access a file loaded from a storage to memory,
wherein the memory is included in a disk cache configured to be managed by an operating system within the virtual machine, and the storage is configured to store data including environment information of the virtual machine.

12. The method of claim 11, wherein the managing the virtual machine comprises:
creating task identification information for the task;
determining whether the task is a new task using the task identification information; and
deciding whether to allow the task using a whitelist, including preset task identification information and information about a file to which access is allowed.

13. The method of claim 12, wherein the managing the virtual machine further comprises:
collecting information about a location at which a requested file is stored in the storage and a page frame number of memory included in a disk cache, to which the requested file is loaded, by analyzing input/output requests related to the storage, which are created by and delivered from an operating system in the virtual machine;
extracting semantic information about the file using the page frame number or the information about the location of the file in the storage and adding the page frame number and file information corresponding to the semantic information to monitoring metadata connected with a corresponding page frame; and
acquiring task identification information of a task in response to occurrence of an event in which the page frame included in the disk cache is accessed by the task, and creating event information about the event.

14. The method of claim 13, wherein:
the managing the virtual machine further comprises detecting a system call invoked by the task, acquiring system call arguments that are input when the task invokes the system call by monitoring a system call table, and thereby acquiring file information of a file to which access is attempted by the task, and
the deciding whether to allow the task is configured to allow access by the task when the task identification information of the task and file information of the file to which access is attempted by the task are included in the whitelist.

15. The method of claim 14, wherein the deciding whether to allow the task is configured to perform a preset operation for the task when the task identification information and the file information are not included in the whitelist.

16. The method of claim 15, wherein the preset operation is forcibly terminating the task.

17. The method of claim 16, wherein:
the creating the task identification information is configured to create simplified task identification information for the task using only a register value of a core on which the task is running or using a combination of the register value and a path of a source image file of the task, and
the deciding whether to allow the task is configured to decide whether to allow access by the task using an index table created based on the simplified task identification information and simplified file information specifying a file to which access is attempted by the task.

18. The method of claim 17, wherein the acquiring the file information is configured to store file information acquired from the system call arguments in a metadata area of the page frame in which data, loaded by invoking the system call, are stored.

19. The method of claim 18, wherein the sematic information is acquired by backtracking metadata information of the disk cache using the information about the location of the file in the storage.

20. The method of claim 18, wherein the semantic information is acquired by extracting file information from the system call arguments using the information about the location of the file in the storage.

* * * * *